United States Patent [19]

Ogle

[11] E Re. 29,629

[45] Reissued May 9, 1978

[54] DISPLAY PANEL

[75] Inventor: James A. Ogle, Neshanic Station, N.J.

[73] Assignee: Burroughs Corporation, Detroit, Mich.

[21] Appl. No.: 799,859

[22] Filed: May 23, 1977

Related U.S. Patent Documents

Reissue of:

[64] Patent No.: 3,886,389
Issued: May 27, 1975
Appl. No.: 428,415
Filed: Dec. 26, 1973

[51] Int. Cl.[2] ..... H01J 61/06

[52] U.S. Cl. ..... 313/217; 313/188; 313/216; 313/220; 315/169 TV

[58] Field of Search ..... 313/188, 216, 217, 220; 315/169 TV

[56] References Cited

U.S. PATENT DOCUMENTS

| | | | |
|---|---|---|---|
| 3,042,823 | 7/1962 | Willard | 313/6 |
| 3,157,824 | 11/1964 | Jones | 315/169 R |
| 3,725,713 | 4/1973 | Kupsky | 313/220 X |
| 3,989,981 | 11/1976 | Ogle et al. | 315/169 TV |

*Primary Examiner*—Rudolph V. Rolinec
*Assistant Examiner*—Darwin R. Hostetter
*Attorney, Agent, or Firm*—Kevin R. Peterson; Robert A. Green

[57] ABSTRACT

The display panel includes a base plate which carries a plurality of pairs of scanning cathodes and display cathodes, oriented in columns, and insulating spacers which, in each pair, separate the scanning and display cathodes into operative pairs, with the pairs being arrayed in rows and columns. The panel also includes a face plate which carries a plurality of anode strips, oriented in rows, each strip overlaying and having a portion in operative relation with a row of scanning and display cathode pairs. In each pair of cathodes, only the display cathode is visible to a viewer. The face plate and base plate are sealed together to form an envelope which is filled with a gas suitable for supporting cathode glow.

23 Claims, 9 Drawing Figures

Fig. 2
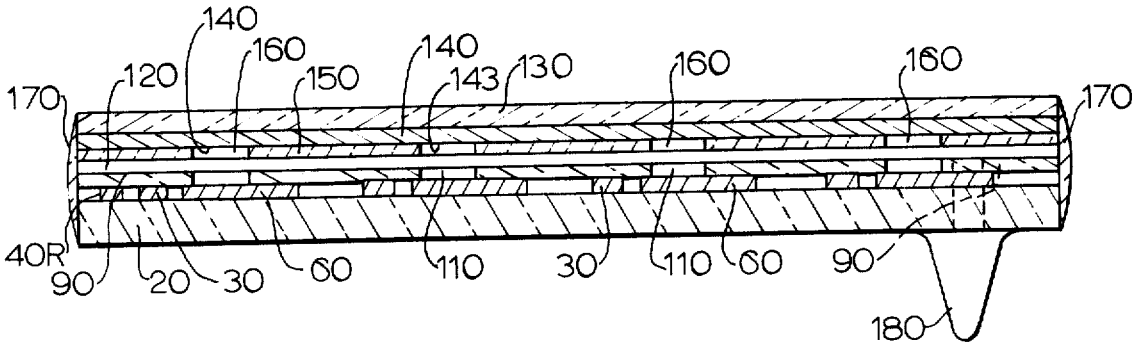
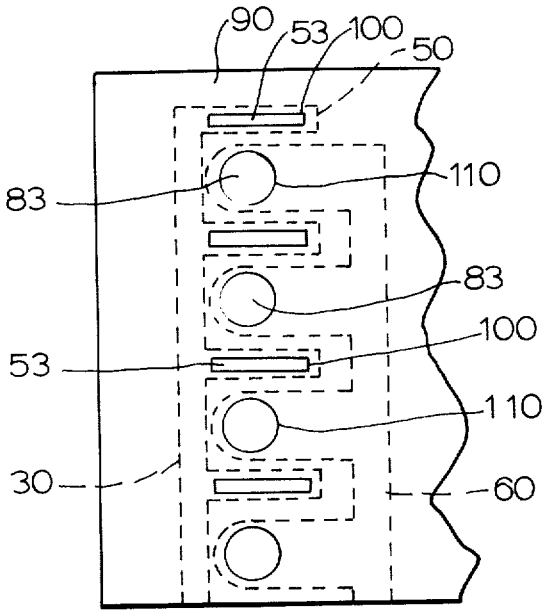
Fig. 3
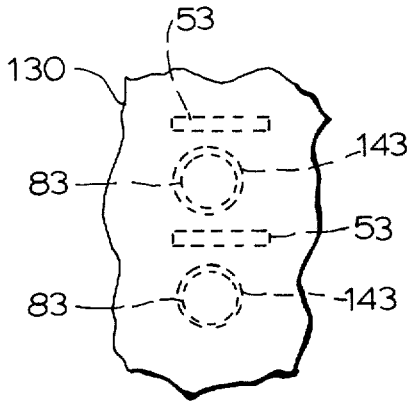
Fig. 4

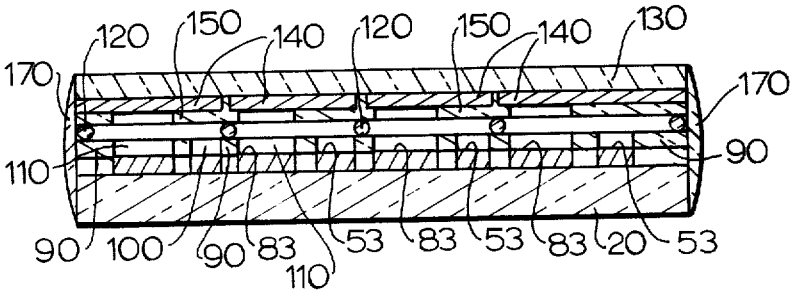
Fig. 5
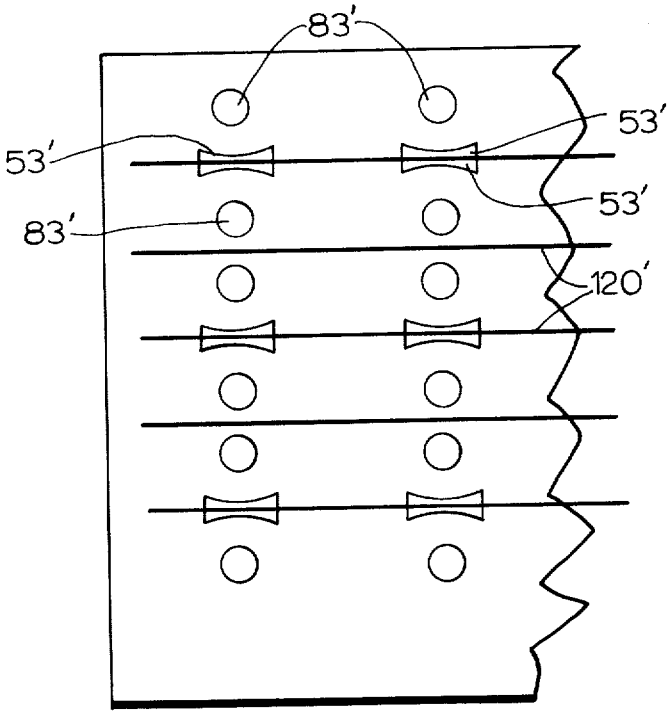
Fig. 8
Fig. 9
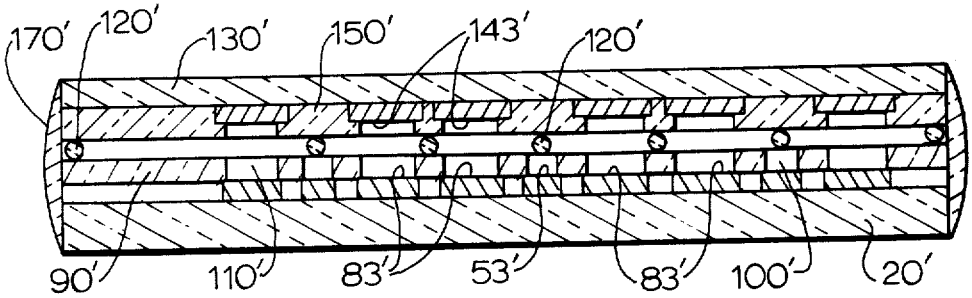

DISPLAY PANEL

Matter enclosed in heavy brackets [ ] appears in the original patent but forms no part of this reissue specification; matter printed in italics indicates the additions made by reissue.

BACKGROUND OF THE INVENTION

One type of display panel presently available commercially is made by Burroughs Corporation and is known as a SELF-SCAN panel. This type of panel is a dot matrix device and includes a first layer of dot-like cells arrayed in rows and columns and adapted to be scanned column by column. The panel includes a second layer of display cells, each such cell being aligned with one of the cells of the first layer which are known as priming or scanning cells and adapted to have glow transferred thereto as the scanning cells are scanned in accordance with input information signals. These input signals control the pattern of display cells which are caused to flow to provide a display of a character or message.

This known type of panel operates satisfactorily; however, no matter how well a device operates, there is always a need for simplification in structure to provide economies in mass production. In addition, the above-described SELF-SCAN panel structure does not readily lend itself to the manufacture of large size panels, for example, of the type known in the industry as wall displays.

SUMMARY OF THE INVENTION

Briefly, a display panel embodying the invention includes pairs of scanning and display cathodes disposed on a first plane and an anode electrode in operative relation with both cathodes, only the display cathode of each pair being visible to a viewer. The cathode pairs and their associated anodes are arrayed in rows and columns, and gas communication paths are provided along the various rows to simplify circuit operation of the panel.

DESCRIPTION OF THE DRAWINGS

FIG. 2 is a sectional view along the line 2—2 in FIG. 1 showing the panel assembled;

FIG. 3 is a plan view of a portion of the panel of FIG. 2;

FIG. 4 is an enlarged plan view of two adjacent electrode pairs of the panel of the invention;

FIG. 5 is a sectional view along the lines 5—5 in FIG. 1 showing the panel assembled;

FIG. 8 is a plan view of portions of the panel of FIG. 7; and

FIG. 9 is a sectional view along the lines 9—9 in FIG. 7.

DESCRIPTION OF THE PREFERRED EMBODIMENTS

Figure 1:
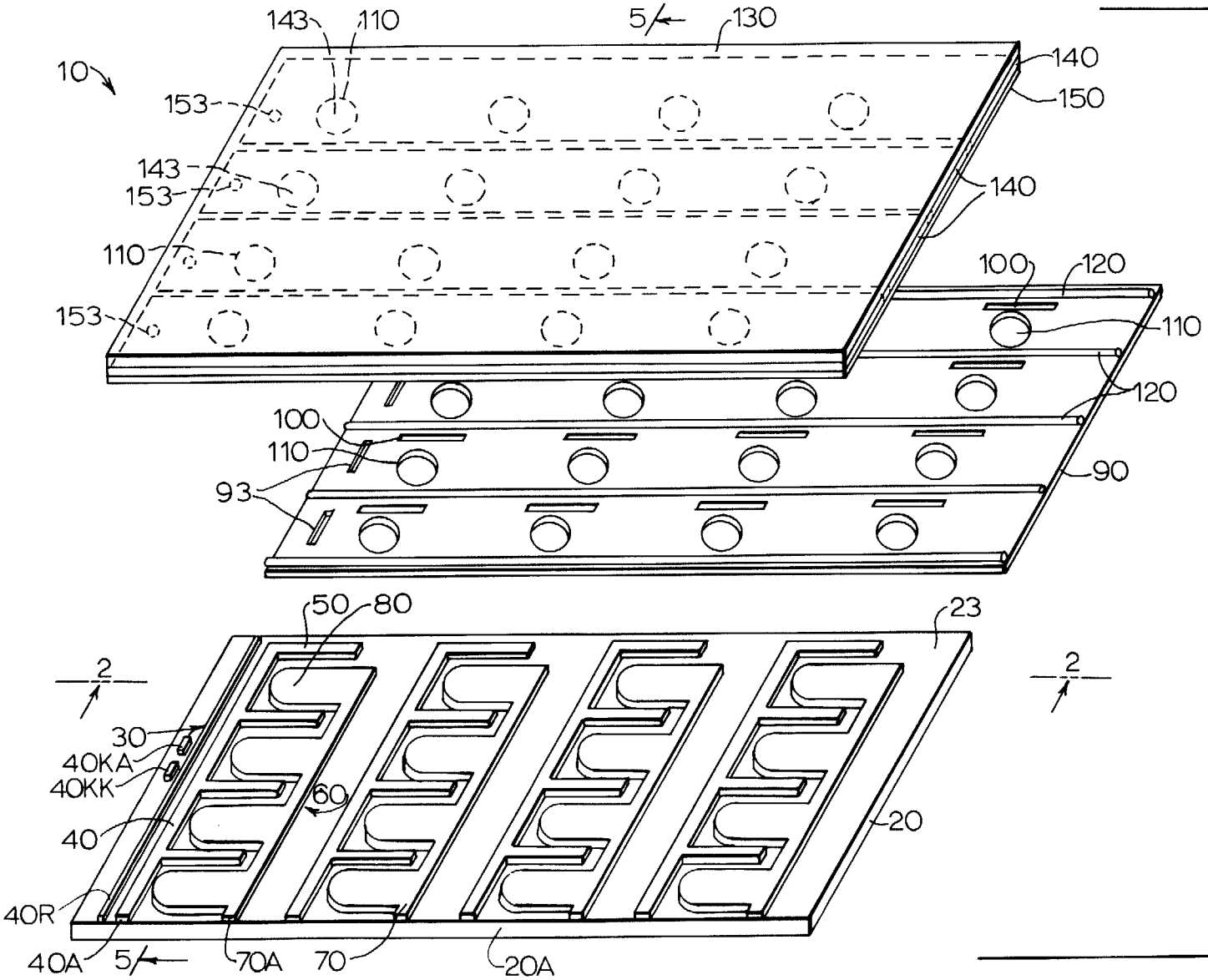
FIG. 1 is an exploded, perspective view of a display panel embodying the invention.

A display panel 10 embodying the invention (FIGS. 1 and 2) includes a base plate 20 of glass, ceramic, or the like having a top surface 23 on which are provided a plurality of cathode pairs. The cathode pairs include a first comb-like member 30 comprising an elongated lead portion 40 having a plurality of fingers 50 projecting therefrom toward the adjacent second member 60 which itself comprises an elongated lead portion 70 having a plurality of fingers 80 projecting therefrom and disposed between the fingers 50 of the first member 30. The fingers 50 of the first member 30 are narrower than the fingers 80 of the second member 60. The first and second cathode members 30 and 60 can be formed of individual metal strips, or they can be, and are preferably, formed by a silk-screen process using a powdered metal in a suitable carrier.

The panel 10 is to be used in a scanning mode of operation wherein the pairs of cathode members 30 and 60 are scanned sequentially, beginning at the left and continuing to the right, as seen in FIG. 1. Under some circumstances, it is desirable to provide means for insuring that the first cathode in the series 40A will turn on at the beginning of a scanning cycle, and this means comprises an auxiliary reset cathode electrode 40R in the form of a linear conductor positioned to the left of, but close to, cathode 40A.

It might also be desirable to provide a keep-alive cell comprising a small-area cathode 40KK and a small-area keep-alive anode 40KA formed on the top surface of plate 20 adjacent to cathode 40R and cathode 40A. The keep-alive cell is constantly energized and provides a source of excited particles for the other cells of the panel.

Reset cathode 40R and keep-alive electrodes 40KA and 40KK may also be formed by a silk-screen process.

A layer 90 of insulating material of glass or the like is formed over the cathodes by any suitable process, preferably a silk-screen process, and including a single elongated slot 93 or a plurality of short slots arranged in a column overlaying reset cathode 40R. Layer 90 also includes a plurality of columns of alternating narrow rectangular openings 100 and circular openings 110. Each narrow rectangular opening overlays and exposes a rectangular portion 53 (FIG. 3) of each finger 50, and each circular opening overlays and exposes a circular portion 83 of a finger 80. Rectangular electrode portions 53 comprise scanning cathodes, and circular electrode portions 83 comprise display cathodes.

The openings 50 and 80 and the exposed electrodes 53 and 83 are aligned in columns. A plurality of thin insulating rod spacers 120, of glass or the like, are disposed longitudinally on the insulating layer 90, and each is positioned between a rectangular aperture and a circular aperture so that they, in effect, isolate the columns of apertures into pairs, with each pair including a rectangular aperture and its electrode and a circular aperture and its electrode. It is noted that row-wise the pairs of rectangular and circular apertures and electrodes are in gas communication with each other. A spacer rod 120 is also provided along the upper and lower margins of layer 90. Under some circumstances, spacer rods 120 may provide sufficient isolation between rows of cells, in which case, insulating layer 90 may be omitted from the panel.

The panel 10 also includes a top glass cover plate 130, the bottom surface of which is provided with a plurality of separate strips 140 of transparent conductive material such as NESA, with each strip overlaying reset cathode 40R and a row of pairs of scanning cathodes 53 and display cathodes 83. A coating 150 of opaque insulating material is provided over the anode strips 140, with circular apertures 153 formed therein overlaying and aligned with aperture 93 which exposes reset cathode 40R. Coating 150 also includes circular apertures 160 formed in vertical alignment with each circular aperture 110 and display cathode 83 and of approximately the same diameter (FIG. 4). Each circular opening 110 exposes a circular portion 143 of the underlying anode strip, the portion 143 comprising the anode for the associated pair of scanning and display cathodes. The cover plate 130 is seated on the glass rod spacers 120 to provide suitable spacing between the anodes on the fact plate and the cathodes supported on the base plate.

The base plate and face plate are hermetically sealed together along their adjacent edges by means of a seal 170 formed of a glass frit or the like, as is well known in the art. The panel 10 is filled with the desired gas such as neon, argon, or the like through a tubulation 180 secured to the base plate and aligned with a hole 190 in the base plate 20 and insulating layer 90. Mercury vapor is also included in the envelope to minimize cathode sputtering. The desired gas and the optimum pressure therefor can be readily determined by those skilled in the art. It is known that firing potential, gas pressure and electrode spacing are related, and those skilled in the art can select the desired gas pressure from this relationship. In the present invention, gas pressures in the range of 100 to 300 Torr are suitable.

It is noted that each open circular anode area 143 overlays and is in operative relation with a display cathode 83; however, it is also in operative relation with the associated scanning cathode 53 (FIG. 5), and a volume of gas fills the space in which these electrodes are located. The scanning cathode 53 and the associated anode 143 comprise a scanning, or priming, cell, and the display cathode 83 and the associated anode 143 comprise a display cell.

To make electrical connections to panel 10, contact terminals are secured in any suitable fashion to the portions 40 of cathodes 30 and portions 70 of cathodes 60, preferably the portions 40A and 70A thereof which are positioned at the lower edge 20A of base plate 20 (FIG. 1). Connection is made in similar fashion to one of the ends of the anode strips 140. Alternatively, the base plate and face plate may be suitably dimensioned to permit contact members to be inserted between them to make the desired electrical connection to the various panel electrodes. The latter type of connection is employed with PANAPLEX II display panels, which are presently offered for sale by Burroughs Corporation and are shown in copending application Ser. No. 201,655, filed Nov. 24, 1971.

Figure 6:
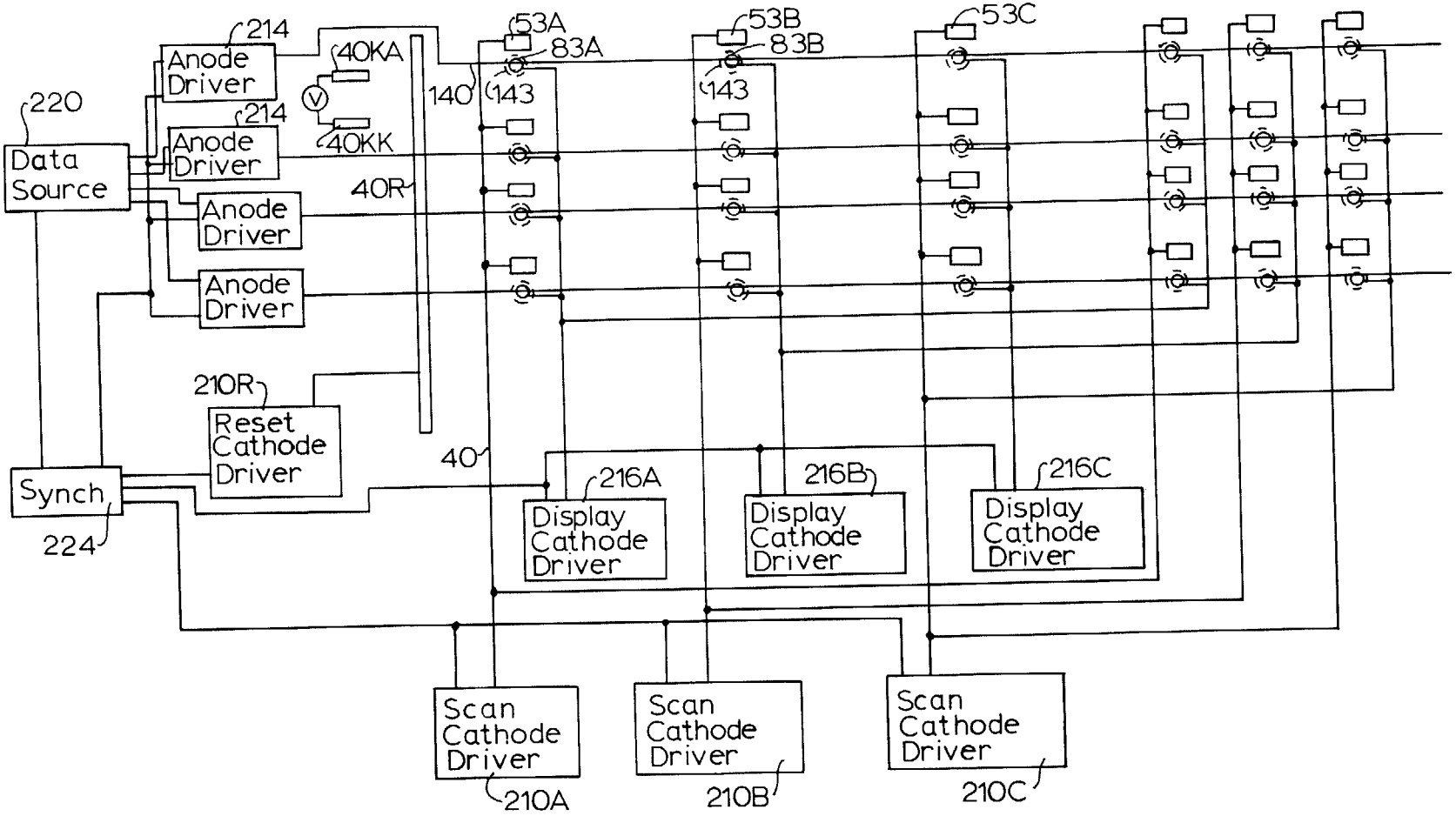
FIG. 6 is a schematic representation of the panel of the invention and a circuit in which it may be operated.

The display panel 10 may be operated in several different ways; however, basically, the panel utilizes principles of operation of the type employed in SELF-SCAN panels, which are made and sold by Burroughs Corporation. One mode of operation is described with reference to FIG. 6, which is a schematic representation of panel 10 and a circuit in which it may be operated. Essentially, operation of the panel comprises scanning and turning on the column of scanning, or priming, cells 53 sequentially and continually throughout the panel by connecting the scan cathode conductors 40 to drivers or switches 210. The keep-alive anode 40KA and keep-alive cathode 40KK are connected to a source of potential V, and they are held ON constantly to provide a steady source of excited particles. The reset cathode 40R is connected to a driver or switch 210R, and the scan cathode conductors 40 are connected in three groups, with every fourth such conductor being connected to a driver or switch 210. The three drivers are designated by reference numerals 210A, B, and C. The display cathodes are similarly connected in three groups, and their conductors 70 are coupled to cathode drivers or switches 216A, B, and C. In addition, an anode driver 214, which operates as a current source, is coupled to each anode 140, and a source of data signals 220 is connected to each anode driver. Data source 220 represents an array of information-handling apparatus including, as required, computer, encoders, decoders, character generators and the like apparent, as is well known in the art. The circuit also includes suitable clock or synchronizing circuits 224 coupled to the data source 220, to the anode drivers 214, and to the cathode drivers 210 and 216 for synchronizing the operation in a manner described below.

Briefly, operation of the panel 10 comprises, turning on the reset cells formed by cathode 40R and the anodes, by the application of operating potentials and causing current flow therebetween, and then the columns of scanning cells 53 are turned on sequentially throughout the panel by the turn-on of each scan cathode driver 210, in turn, and by the simultaneous turn-on of all of the anode drivers 214. As each column of scanning cathodes and scanning cells is energized, the associated column of display cathodes and display cells is energized, and, by applying the proper potential to selected anodes as determined by the input information signals, and generating corresponding current flow, the associated selected display cathodes can be made to glow. This glow is visible to a viewer, and, as the columns of scanning cells are continually scanned throughout the panel, and selected associated display cells are turned on at suitable current level, an apparently stationary but changeable message is displayed by the selected display cells.

More specifically, in operation of panel 10, with the keep-alive cell energized and generating excited particles, the reset cathode driver 201R is switched on and the anode drivers 214 are energized to cause current flow between the reset cathode and the anodes and to cause cathode glow to appear along the reset cathode 40R. Thus, excited particles are generated thereby and are available for the scanning cycle which is initiated by the turn-off of the reset cathode driver 201R and the turn-on of scan cathode driver 210A, with the anodes still energized. Current flows between the first column of scan cathodes 53 and the anodes, and the first column of scanning cells is energized, with the applied potentials being adjusted so that the scanning cells are turned on at a low level of excitation and current flow.

It is noted that, although the scan cathode driver 210A is connected to other columns of scan cathodes, because of their remoteness from the excited particles generated by the reset cathode, they do not turn on; the first scan cathode turns on preferentially because of its closeness to the reset cathode, the source of excited particles.

Next, the first display cathode driver 216A is turned on to cause current flow between the first column of display cathodes 83A and the anodes, and simultaneously, signals from data source 220 coupled to selected anode drivers 214 cause suitably higher currents to flow to the selected anodes 140, from their associated display cathodes and the display cathodes 83A associated with such selected anodes glow at a favorable visible level.

Next, display cathode driver 216A is turned off and scan cathode driver 210A is turned on again, and, at the same time, all of the anodes 140 are energized at a low level so that a low level of current flows to all of the first scan cathodes 53A, and they are thus reenergized and they again generate excited particles.

It is noted that the display cathodes selected by the data signals are turned on for a relatively short period of time of the order of 100 microseconds to insure that excited particles, which had been generated by the scan cathodes when they were first turned on, are present in sufficient supply to permit all of the scan cathodes to be turned on again.

The foregoing operation is repeated for each column of scan cathodes and display cathodes continually and sequentially through the panel at such a rate that display cells which are selected and turn on in each column, in accordance with the signals from data source 220, display an apparently stationary but changeable message in all of the selected display cells.

Figure 7:
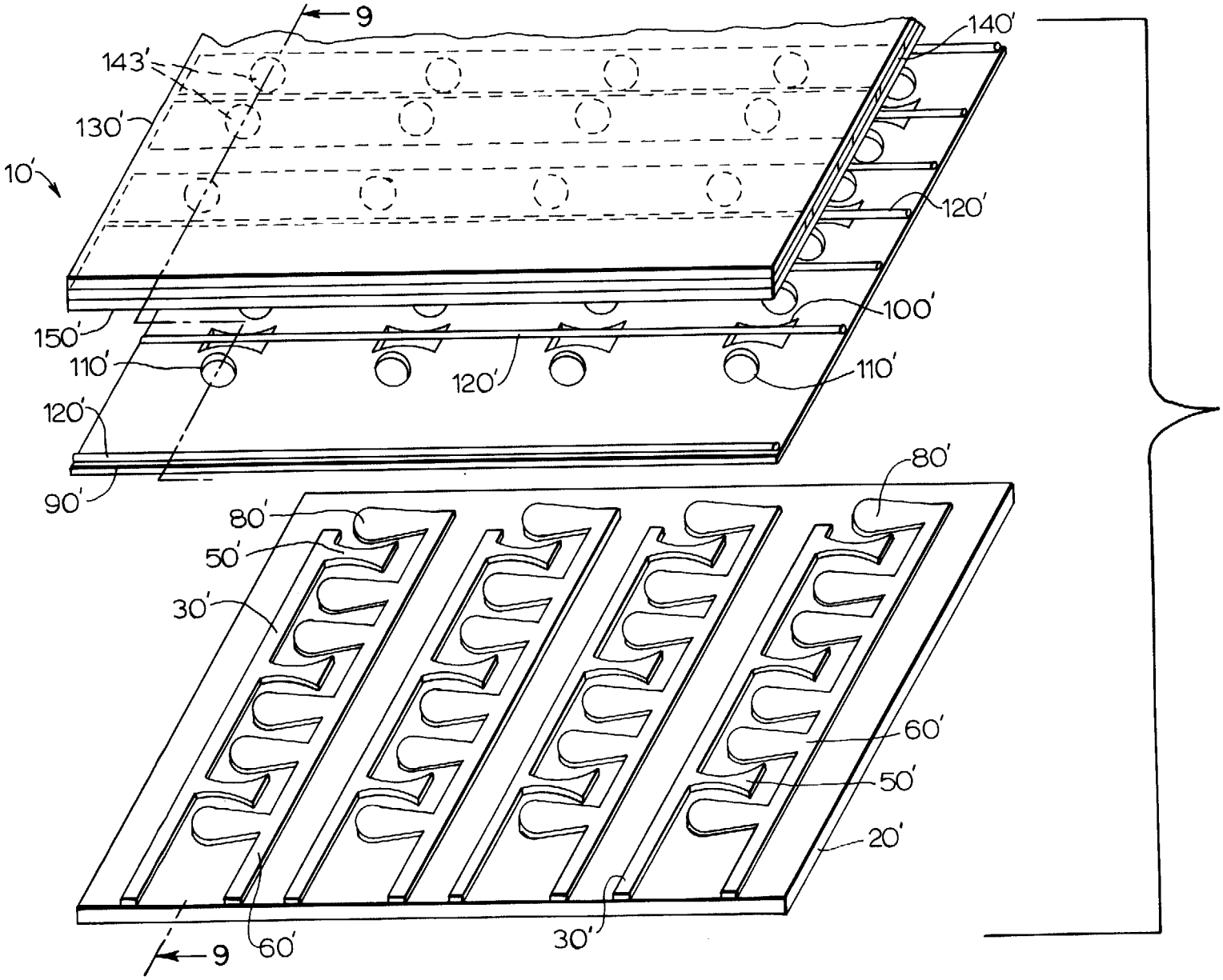
FIG. 7 is an exploded, perspective view of a display panel embodying modifications in the invention.

In another embodiment of the invention (FIGS. 7, 8, and 9), a display panel 10' includes base plate 20' and a pattern of screened cathode electrode pairs, each including scan cathode members 30' and display cathode member 60' which are generally similar to corresponding cathodes 30 and 60 of panel 10. In this case, each scan cathode finger 50' is disposed between its own pair of display cathode fingers 80'. The panel 10' includes an insulating layer 90' formed on the base plate 20' and having circular apertures 110' overlaying fingers 80' and relatively wide, generally dumbbell or rectangular shape apertures 100' overlaying fingers 50'. Apertures 100' and 110' are aligned in columns, and it can be seen that each aperture and the scan cathode 53' it exposes is disposed between a pair of circular apertures 110' and display cathodes 83' exposed thereby. Glass rod spacers 120' are seated on insulating layer 90' overlaying the openings 100' and so positioned that they separate each such opening and the associated scan cathodes 53 into two portions, one associated with the display anode 143 above it in the column, and the other associated with the display cell below it in the column. In addition, a spacer rod 120' is disposed between the adjacent circular openings 110' which are not separated by an opening 100'.

Panel 10' also includes face plate 130 which carries on its lower surface, anode strips 140' covered with an opaque layer 150' having circular openings 160' overlaying display cathodes 83'.

Thus, it can be seen, as illustrated in FIGS. 8 and 9, that each column of cells includes a scanning cell made up of an anode 143' and a scanning cathode 53', and a display cell made up of the same anode 143' and a display cathode 83'. As shown, each scanning cathode 53' operates with two adjacent anodes 143' to form adjacent scanning cells.

The operation of panel 10' is essentially the same as panel 10 except that each scan cathode 53' operates with two display cathodes 83' to provide economy in device and circuit structures.

The display panel of the invention has many advantages which derive from its relative simplicity of construction. Since the panel includes only two electrode-support plates, and all of the cells are disposed in a single layer, it is clear that the construction is relatively simple and economical. In addition, since the panel includes only a single layer of cells, individual panels can be made in larger size than the SELF-SCAN panels described above. Also, a complete "wall-size" panel may be made by butting together the individual panels.

What is claimed is:

1. A display panel comprising a gas-filled housing, a plurality of *coplanar* electrode pairs supported on a surface in said housing and oriented in rows *and columns,* said electrodes being operable as cathode electrodes *and each electrode pair including a scan cathode and a display cathode,* [and]

*each of the scan cathodes being in gas communication and glow priming relationship with the corresponding scan cathodes of the next succeeding column and with at least one display cathode, so that each scan cathode, when it glows, primes a scan cathode of the next succeeding column and at least one display cathode, and* an anode electrode in operative relation with each row of said cathode electrode pairs, said anode being operable with each member of said pair separately to comprise separate ionizable gas cells.

2. The panel defined in claim 1 and including a plurality of longitudinal barrier members, each disposed between adjacent rows of said electrode pairs.

3. The panel defined in claim 1 and including an insulating sheet disposed over said cathode electrode pairs and including a separate aperture aligned with each cathode of each pair.

4. The panel defined in claim 1 wherein said anodes comprise *a* transparent conductive [strips] *layer* which [are] *is* coated with a layer of opaque insulating material having a plurality of apertures, each [being] *aperture exposing an anode which is* in operative relation with a cathode electrode pair.

[5. The panel defined in claim 1 wherein said anodes comprise transparent conductive strips which are coated with a layer of opaque insulating material having a plurality of apertures, each being in operative relation with a cathode electrode pair and each directly overlaying one member of each said pair.]

[6. A display panel comprising a gas-filled envelope, a plurality of electrode pairs supported on a surface of said panel and arrayed in rows and columns, each pair of electrodes including one operable as a scanning cathode and one operable as a display cathode, and transparent conductive anode strip electrodes disposed within said panel spaced from said electrode pairs and each oriented overlaying and in operative relation with a row of said electrode pairs;

each electrode of a pair being separately operable with its associated anode to comprise separately energizable gas cells.]

7. A display panel comprising a gas-filled envelope, a support plate in said envelope, a first conductive member disposed on said plate and including a first vertical arm and a plurality of first horizontal projections, a second conductive member disposed on said plate positioned adjacent to said first member and including a second vertical arm and second horizontal projections, said first and second horizontal projections being interleaved to form electrode pairs, each including a first horizontal projection and a second horizontal projection *and each electrode pair including a scan cathode and a display cathode,* there being a plurality of said first and second conductive members disposed side-by-side along the surface of said support plate to provide a plurality of rows *and columns* of said electrode pairs,

*each of the scan cathodes being in gas communication and glow priming relationship with the corresponding scan cathodes of the next succeeding column and with at least one display cathode, so that the scan cathodes of each column, when they glow, prime the display cathodes of the same column and the scan cathodes of the next succeeding column,* and

[a plurality of longitudinal barrier members, each disposed between adjacent rows of said electrode pairs, and]

a plurality of anode electrodes, each in operative relation with one of said electrode pairs.

[8. The panel defined in claim 7 and including an insulating sheet disposed over said cathode electrode pairs and including a separate aperture aligned with each cathode of each pair.]

[9. The panel defined in claim 8 wherein said anodes comprise transparent conductive strips which are coated with a layer of opaque insulating material having a plurality of apertures, each being in operative relation with a cathode electrode pair.]

[10. The panel defined in claim 8 wherein said anodes comprise transparent conductive strips which are coated with a layer of opaque insulating material having a plurality of apertures, each being in operative relation with a cathode electrode pair and each directly overlaying one member of each said pair.]

11. A display panel comprising a gas-filled envelope, a support plate in said envelope, a plurality of [electrode pairs] *scan cathodes and display cathodes* disposed on said plate and arrayed in *coplanar* rows and columns, [each electrode pair in a column including a first electrode and a second electrode,]

*each of the scan cathodes being in gas communication and glow priming relationship with the corresponding scan cathodes of the next succeeding column and with at least one display cathode, so that each scan cathode, when it glows, primes a scan cathode of the next succeeding column and at least one display cathode,* means on said plate dividing each said [first electrode] *scan cathode* into two separate operative portions, each such portion being *in flow priming relationship and* operable with [and forming an electrode pair with the two adjacent second electrodes] *a different adjacent display cathode* in its columns, and a plurality of [third] *anode* electrodes spaced from said plate and each operable with [one] *certain* of said [electrode pairs] *cathodes.*

12. The panel defined in claim 11 wherein said means comprises a plurality of insulating rods disposed longitudinally on said support plate.

13. The panel defined in claim 11 and including an insulating layer on said support plate and having apertures which expose said electrodes to the gas in said envelope, and said means comprises a plurality of insulating rods disposed longitudinally on said insulating layer.

[14. A display panel comprising a gas-filled housing, a plurality of electrode pairs supported on a surface in said housing and oriented in rows and columns, said electrodes being operable as cathode electrodes, and an anode electrode in operative relation with each of said cathode electrode pairs, said anode being operable with each member of a pair separately to comprise separate ionizable gas cells.]

[15. The panel defined in claim 14 wherein each electrode pair includes a scan cathode and a display cathode.]

[16. The panel defined in claim 15 wherein each said display cathode is visible through said housing.]

[17. A display panel comprising a gas-filled housing, a plurality of electrode pairs supported on a surface in said housing and oriented in rows and columns, said electrodes being operable as cathode electrodes, and a plurality of anode electrodes, with each anode electrode in operative relation with at least one of said cathode electrode pairs, said anode being operable with each member of a pair separately to comprise separate ionizable gas cells.]

[18. The panel defined in claim 15 wherein each said anode electrode is an elongated electrode in operative relation with a row of said electrode pairs.]

[19. The panel defined in claim 18 wherein each said anode is a transparent conductive film seated on a portion of said housing.]

[20. The panel defined in claim 14 and including a plurality of longitudinal barrier members, each disposed between adjacent rows of said electrode pairs.]

[21. The panel defined in claim 14 and including an insulating sheet disposed over said cathode electrode pairs and including a separate aperture aligned with each cathode of each pair.]

[22. The panel defined in claim 18 wherein said anodes comprise transparent conductive strips which are coated with a layer of opaque insulating material having a plurality of apertures, each aperture being in operative relation with a cathode electrode pair.]

[23. The panel defined in claim 18 wherein said anodes comprise transparent conductive strips which are coated with a layer of opaque insulating material having a plurality of apertures, each being in operative relation with a cathode electrode pair and each directly overlaying one member of each said pair.]

[24. The panel defined in claim 14 wherein each electrode pair includes a scan cathode and a display cathode, and including a common electrical connection to all of the scan cathodes in a column of electrode pairs.]

[25. The panel defined in claim 14 wherein each electrode pair includes a scan cathode and a display cathode, and including a common electrical connection to all of the scan cathodes in a column of electrode pairs, and another common electrical connection to all of the display cathodes in a column of electrode pairs.]

*26. The panel defined in claim 7 further including a plurality of longitudinally extending barrier members each*

*isolating the gaseous cells of adjacent rows of said electrode pairs.*

*27. A display panel comprising*

*a gas-filled envelope including a base plate and a face plate having a viewing window,*

*a plurality of coplanar cathode electrode pairs supported on said base plate, each pair comprising a first cathode and a second cathode, said cathode electrode pairs being arrayed in rows and columns,*

*each first cathode comprising a display cathode and each second cathode comprising a scan cathode for supplying excited particles for its associated display cathode,*

*a first plurality of column conductors each connecting all of the scan cathodes of a respective one of said columns,*

*a second plurality of column conductors each connecting all of the display cathodes of a respective one of said columns,*

*a plurality of anode electrodes, each in operative glow discharge relationship with the scan and display cathodes of one of said rows, and*

*conductor means for energizing said scan cathodes in a scan pattern and synchronously energizing selected groups of said display cathodes.*

*28. A display panel as in claim 27 wherein the scan cathodes of each column are in gas communication and glow priming relationship to the corresponding scan cathodes of the next succeeding column, so that each such scan cathode, when it glows, primes the corresponding scan cathode of the next succeeding column.*

*29. A gaseous discharge display panel comprising*

*an envelope formed of a face plate, at least portions of which are transparent, and a base plate,*

*said plates being spaced closely to one another and sealed together to form a gas-tight enclosure,*

*an ionizable gas within said enclosure at a pressure capable of sustaining a cathode glow discharge,*

*a plurality of display cathode electrodes arranged in an array of rows and columns on said base plate and in alignment with certain of the transparent portions of the face plate,*

*a plurality of scan cathodes arranged in rows and columns on said base plate coplanar with said display cathodes,*

*each of the scan cathodes being in gas communication and glow priming relationship with the corresponding scan cathodes of the next succeeding column and with at least one display cathode, so that each scan cathode, when it glows, primes a scan cathode of the next succeeding column and at least one display cathode, and*

*a plurality of elongated anode electrodes, each in operative glow discharge relationship with both a row of said display cathodes and an adjacent row of said scan cathodes.*

*30. A display panel as in claim 29 wherein said plurality of scan cathodes includes one scan cathode for every two display cathodes, each of said scan cathodes being in gas communication and glow priming relationship with two of said display cathodes.*

*31. A display panel as in claim 29 further including an apertured sheet of insulating material located between said cathodes and the elongated anodes, said sheet having an aperture aligned with each of said scan cathodes and a separate aperture aligned with each of said display cathodes.*

*32. A display panel as in claim 29 wherein said anode electrodes are transparent and located between the display cathodes and the face plate.*

*33. A display panel as in claim 29 further including conductor means connected to said display cathodes and to said scan cathodes for alternately energizing selected ones of said scan cathodes and selected ones of said display cathodes in a time-sharing mode.*

*34. A display panel as in claim 29 further including conductor means connected to said anodes for energizing all of the anodes while the scan cathodes in the first column are being energized, then energizing selected ones of said anodes while the display cathodes of the first column are being energized, and then repeating this pattern for each column of the array.*

*35. A gaseous discharge display panel comprising*

*an envelope formed of a face plate, at least portions of which are transparent, and a base plate,*

*said plates being spaced closely to one another and sealed together to form a gas-tight enclosure,*

*an ionizable gas within said enclosure at a pressure capable of sustaining a cathode glow discharge,*

*a plurality of conductive members forming display cathode electrodes arranged in an array of rows and columns on said base plate, said display cathodes being in alignment with certain of the transparent portions of the face plate,*

*a plurality of separate conductive members forming scan cathode electrodes arranged in rows and columns on said base plate substantially coplanar with said display cathodes,*

*each of the scan cathodes being in gas communication and glow priming relationship with the corresponding scan cathodes of the next succeeding column and with at least one display cathode, so that each scan cathode, when it glows, primes a scan cathode of the next succeeding column and at least one display cathode,*

*a plurality of anode electrodes, each in operative glow discharge relationship with the scan and display cathodes of one of said rows, and*

*conductor means for energizing said scan cathodes in a scan pattern and synchronously energizing selected groups of said display cathodes.*

*36. A display panel as in claim 35 wherein said conductor means is for energizing said scan cathodes, one column after another, by causing all of the scan cathodes in one column to glow, and then all of the scan cathodes in the next succeeding columns, one column after another in a sequential scan.*

*37. A display panel as in claim 36 wherein said conductor means includes means for applying successive groups of information signals to said anodes, one such group after another, in synchronism with the scanning of the scan cathodes, to produce a predetermined glow pattern in said panel.*

*38. A display panel as in claim 35 wherein said conductor means includes*

*a first plurality of conductors, each of which connects electrically in common all of the scan cathodes of a respective one of said columns, and*

*a second plurality of conductors, each of which connects electrically in common all of the display cathodes of a respective one of said columns.*

*39. A display panel as in claim 38 further including a plurality of n energizing circuits, each of which connects electrically in common a different group of said first plurality of conductors, the conductors in each such group being connected to scan cathodes which are n columns apart, to provide n phase scanning of said scan cathodes.*

*40. A display panel as in claim 35 wherein said scan cathodes are hidden from view through the face plate.*

* * * * *